United States Patent
Kfir et al.

(10) Patent No.: US 11,509,579 B2
(45) Date of Patent: Nov. 22, 2022

(54) GATEWAY FOR REMOTE DIRECT MEMORY ACCESS OVER CONVERGED ETHERNET

(71) Applicant: MELLANOX TECHNOLOGIES, LTD., Yokneam (IL)

(72) Inventors: Aviv Kfir, Nili (IL); Barak Gafni, Sunnyvale, CA (US); Ortal Ben-Moshe, Migido (IL); Matty Kadosh, Hadera (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 186 days.

(21) Appl. No.: 17/000,992

(22) Filed: Aug. 24, 2020

(65) Prior Publication Data
US 2022/0060417 A1  Feb. 24, 2022

(51) Int. Cl.
*H04L 45/74* (2022.01)
*H04L 61/2585* (2022.01)
*G06F 15/173* (2006.01)
*H04L 69/16* (2022.01)
*H04L 12/66* (2006.01)

(52) U.S. Cl.
CPC ........ *H04L 45/74* (2013.01); *G06F 15/17331* (2013.01); *H04L 12/66* (2013.01); *H04L 61/2585* (2013.01); *H04L 69/16* (2013.01)

(58) Field of Classification Search
None
See application file for complete search history.

(56) References Cited

U.S. PATENT DOCUMENTS

| | | | |
|---|---|---|---|
| 11,308,024 B2* | 4/2022 | Chen | H04L 69/22 |
| 2004/0022256 A1* | 2/2004 | Green | H04L 61/106 |
| | | | 370/401 |
| 2006/0013251 A1* | 1/2006 | Hufferd | H04L 67/1097 |
| | | | 370/469 |
| 2008/0232801 A1* | 9/2008 | Arnold | H04L 41/0803 |
| | | | 398/58 |
| 2014/0337456 A1* | 11/2014 | Chawla | G06F 15/17331 |
| | | | 709/212 |

OTHER PUBLICATIONS

"LRH and GRH InfiniBand Headers," Mellanox Technologies, Dec. 5, 2018, 3 pages [retrieved online from: community.mellanox.com/s/article/lrh-and-grh-infiniband-headers].
"RoCEv2 CNP Packet Format Example," Mellanox Technologies, Dec. 5, 2018, 4 pages [retrieved online from: community.mellanox.com/s/article/rocev2-cnp-packet-format-example].

* cited by examiner

*Primary Examiner* — Robert M Morlan
(74) *Attorney, Agent, or Firm* — Sheridan Ross P.C.

(57) ABSTRACT

A system, switch device, and method of operating a switch device are provided. An illustrative system is disclosed to include a first router block configured to receive a first type of Remote Direct Memory Access (RDMA) packet, a second router block configured to receive a second type of RDMA packet, and a gateway positioned between the first router block and the second router block. The gateway may be configured to translate the first type of RDMA packet received from the first router block for transmission as the second type of RDMA packet by the second router block.

25 Claims, 11 Drawing Sheets

GATEWAY FOR REMOTE DIRECT MEMORY ACCESS OVER CONVERGED ETHERNET

FIELD OF THE DISCLOSURE

The present disclosure is generally directed toward networking and, in particular, toward supporting memory access.

BACKGROUND

RDMA (Remote Direct Memory Access) is a protocol that enables one host computer to directly access the memory of another host computer without involving either host computer's operating system. RDMA enables access to remote memory over a distributed computing network. RDMA is currently available for use over InfiniBand (IB) networks. When used in connection with an IB network, RDMA is simply called RDMA.

RDMA is also available for use over Ethernet networks. When used in connection with an Ethernet network, RDMA may be referred to as RDMA over Converged Ethernet (RoCE).

In many network deployments, these different types of RDMA networks (e.g., IB networks and Ethernet networks) are not connected. A lack of a connection or RDMA interoperability between network types means that a host computer in one network cannot connect to a host computer in the other network for purposes of conducting RDMA.

BRIEF SUMMARY

Embodiments of the present disclosure aim to solve the above-noted shortcomings and other issues associated with RDMA across different network types. In particular, embodiments of the present disclosure contemplate a system, switch device, and method of operating a switch device to facilitate RDMA between a first host connected to a first network type and a second host connected to a second network type.

In an illustrative embodiment, a system is disclosed that includes: a first router block configured to receive a first type of Remote Direct Memory Access (RDMA) packet; a second router block configured to receive a second type of RDMA packet; and a gateway positioned between the first router block and the second router block, where the gateway is configured to translate the first type of RDMA packet received from the first router block for transmission as the second type of RDMA packet by the second router block.

In another illustrative embodiment, a switch device is disclosed that includes: a first port connectable to and configured to operate with the first network type, where the first port is further configured to receive packets formatted as a first type of RDMA packet; a second port connectable to and configured to operate with the second network type, where the second port is further configured to receive packets formatted as a second type of RDMA packet; and processing circuitry positioned between the first port and the second port, where the processing circuitry is configured to translate the packets received from the first port for transmission via the second port thereby enabling RDMA between the first host and the second host.

In another illustrative embodiment, a method is disclosed that includes: providing a gateway between a first router block and a second router block, where the first router block is configured to receive a first type of Remote Direct Memory Access (RDMA) packet, and where the second router block is configured to receive a second type of RDMA packet; receiving a data packet at the gateway via one of the first router block and second router block; translating content of the data packet for transmission by the other of the first router block and second router block; and transmitting the data packet with the translated content from the gateway to the other of the first router block and second router block thereby enabling RDMA between a first host connected to a first network and a second host connected to a second network that is of a different type than the first network.

Additional features and advantages are described herein and will be apparent from the following Description and the figures.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

Figure 1A:
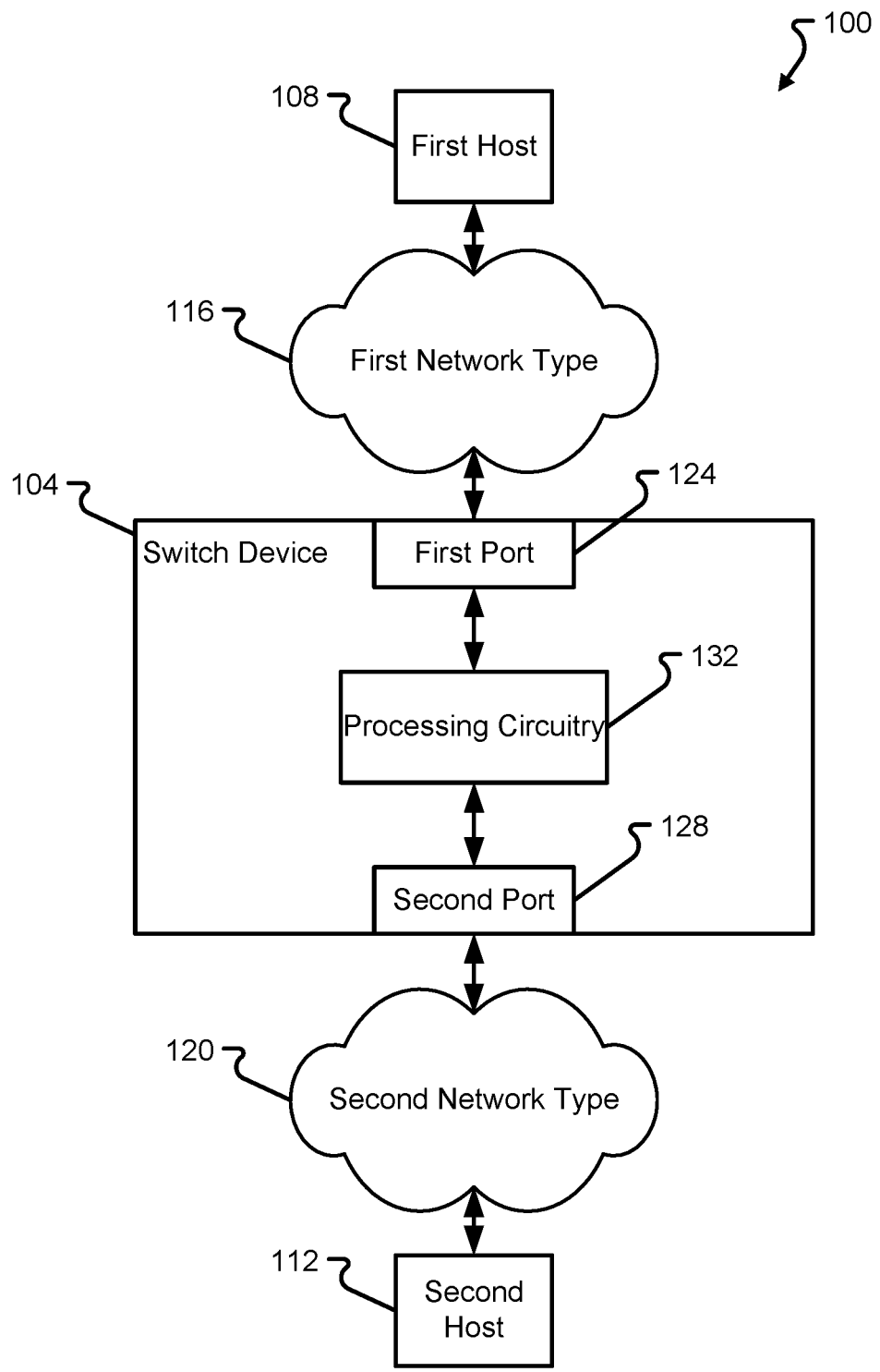
FIG. 1A is a block diagram depicting a first illustrative configuration of a computing system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate suitable carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any appropriate type of methodology, process, operation, or technique.

The term router block and variants used herein may be considered any appropriate component or collection of components capable of and/or configured to perform a routing function. As some non-limiting examples, a router block may include hardware components, software components, firmware components, or combinations thereof. A router block may be capable of and/or configured to perform packet-based routing functions, which may include performing one or more packet inspection processes, translation processes, and forwarding processes.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "and/or" includes any appropriate and all combinations of one or more of the associated listed items.

Referring now to FIGS. 1-9, various systems and methods for enabling RDMA between hosts or host computers connected to different network types will be described in accordance with at least some embodiments of the present disclosure. In particular, examples of enabling RDMA between a host connected to one network type (e.g., an IB network) and another host connected to a different network type (e.g., an Ethernet network) are disclosed.

Figure 1B:
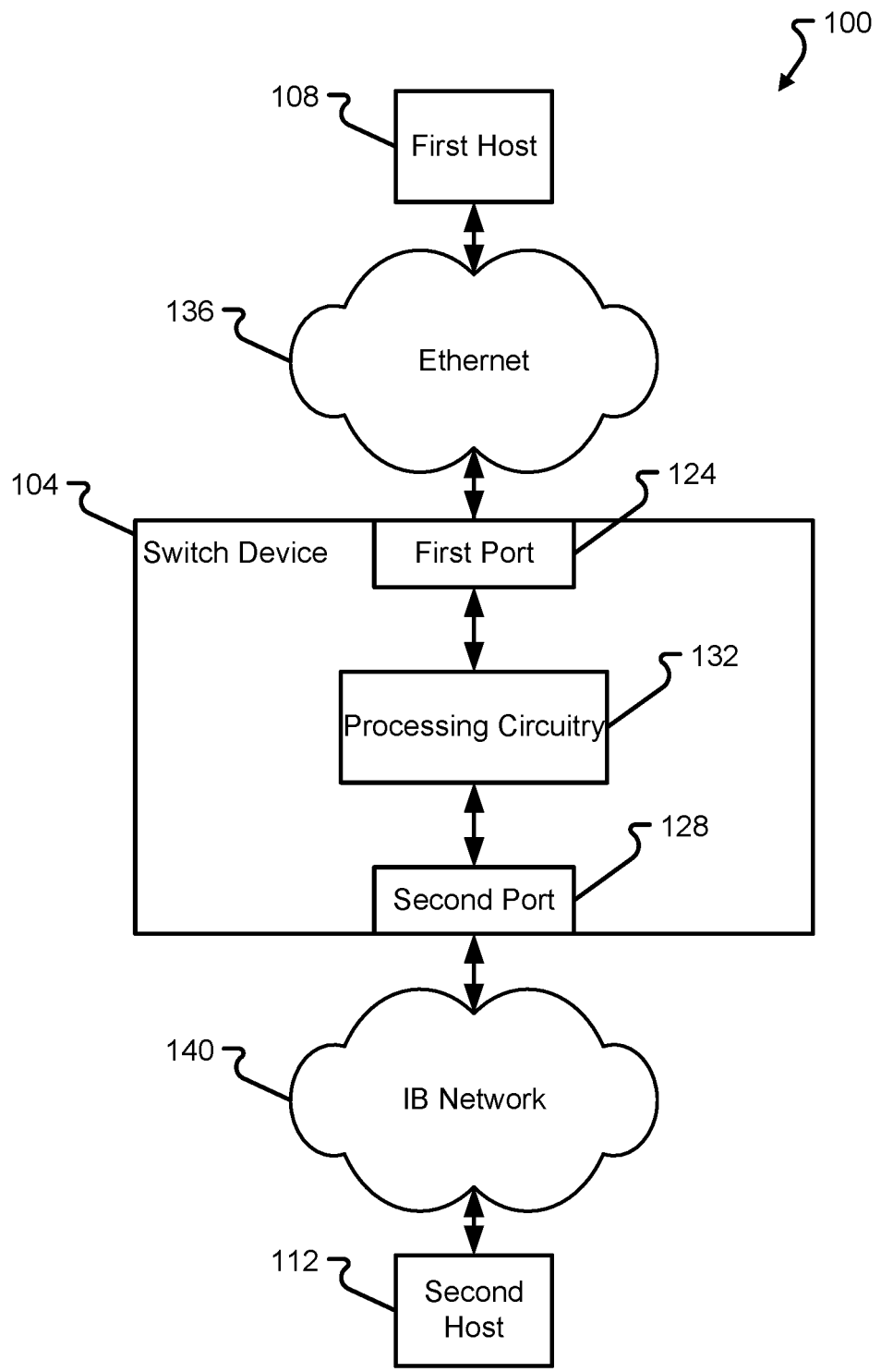
FIG. 1B is a block diagram depicting a second illustrative configuration of a computing system in accordance with at least some embodiments of the present disclosure.
Figure 1C:
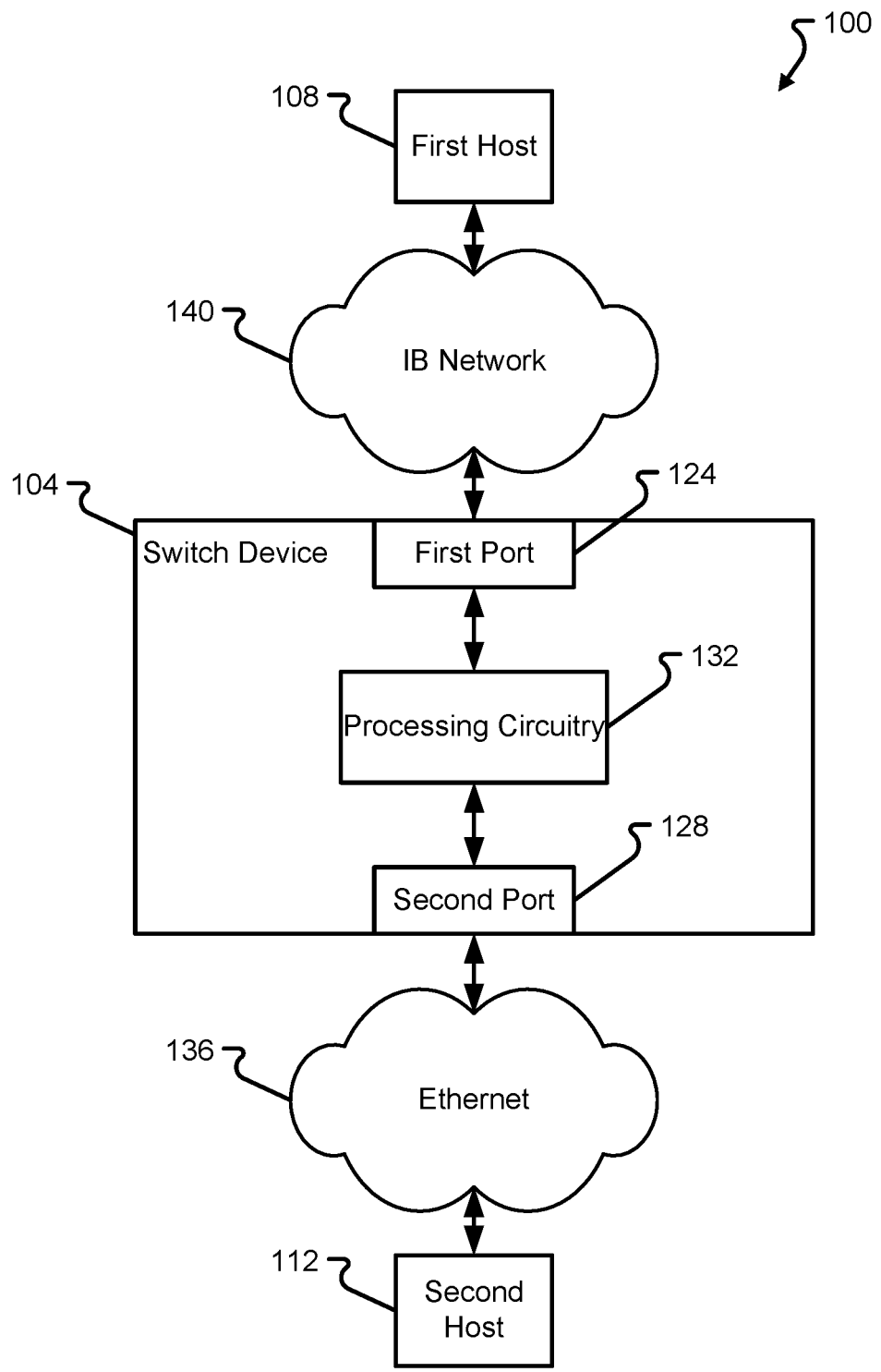
FIG. 1C is a block diagram depicting a third illustrative configuration of a computing system in accordance with at least some embodiments of the present disclosure.

Referring initially to FIGS. 1A-1C, various possible configurations of a computational system 100 will be described in accordance with at least some embodiments of the present disclosure. As shown in FIG. 1A, a first host 108 may be connected to a first network type 116 and a second host 112 may be connected to a second network type 120. Embodiments of the present disclosure contemplate a switch device 104 provided between different network types to enable RDMA between the hosts 108, 112 that are connected to the different network types. Specifically, the switch device 104 may be provided between the first network type 116 and the second network type 120.

In the illustrated embodiment, the switch device 104 is shown to include a first port 124 and a second port 128. The first port 124 may be connectable to and configured to operate with the first network type 116. The first port 124 may also be configured to receive packets formatted as a first type of RDMA packet (e.g., where the first type of RDMA packets are formatted based on protocols defined for use in the first network type 116).

The second port 128 may be connectable to and configured to operate with the second network type 120. The second port 128 may also be configured to receive packets formatted as a second type of RDMA packet (e.g., where the second type of RDMA packets are formatted based on protocols defined for use in the second network type 120). It should be appreciated that because the first network type 116 may be different from the second network type 120, then the first type of RDMA packet may be formatted differently from the second type of RDMA packet.

To accommodate the different network types and different types of RDMA packets used in the different network types, the switch device 104 may also include processing circuitry 132 positioned between the first port 124 and the second port 128. In some embodiments, the processing circuitry 132 may be configured to translate packets received from the first port 124 for transmission via the second port 128. In some embodiments, the processing circuitry 132 may be configured to translate packets received from the second port 128 for transmission via the first port 124. The translation operation(s) performed by the processing circuitry 132 may enable RDMA between the first host 108 and the second host 112 even though the first host 108 is connected to the first network type 116 and the second host 112 is connected to the second network type 120.

In some embodiments, the first host 108 and second host 112 may correspond to host computers or computational devices. One or both of the first host 108 and second host 112 may include any appropriate type of computer or computational device. Illustrative but non-limiting examples of devices that may constitute the first host 108 and/or second host 112 include: a Personal Computer (PC), a laptop, a tablet, smartphone, a server, a collection of servers, or the like. It should be appreciated that a host may also be referred to as a network host. In some embodiments, the first host 108 and/or second host 112 may correspond to any appropriate type of device that communicates with other hosts also connected to the first network type 116 and/or second network type 120. As a more specific non-limiting example, the first host 108 and/or second host 112 may correspond to a server offering information resources, services and/or applications to user devices, client devices, or other hosts in the computational system 100. It should be appreciated that the first host 108 and second host 112 may each be assigned at least one network address and the format of the network address assigned thereto may depend upon the nature of the network to which the host is connected.

As will be discussed in further detail herein, the first network type 116 may be different from the second network type 120, meaning that the first network type 116 utilizes a different communication protocol than the second network type 120. While both network types may correspond to packet-based communication networks, it should be appreciated that the different network types may utilize different communication protocols to enable connectivity and communication between the various devices (e.g., hosts, clients, computers, switches, etc.) connected to or creating the network type. It should also be appreciated that connections between a host and other devices in the network may be facilitate by wired connections, wireless connections, or combinations thereof.

Because the switch device 104 is connected to both the first network type 116 and the second network type 120, the switch device 104 may be considered a part of both network types. In some embodiments, the first port 124 may correspond to a physical data port and/or a driver that enables operation of the physical data port. Likewise, the second data port 128 may correspond to a physical data port and/or a driver that enables operation of the physical data port. One or both of the first data port 124 and second data port 128 may include any appropriate type of socket, hardware, firmware, and/or software that is used to enable data communications between the switch device 104 and the hosts 108, 112.

The processing circuitry 132 may correspond to any appropriate type of known circuit component, collection of circuit components, processor, collection of processors, or combinations thereof. In particular, the processing circuitry 132 may include analog and/or digital circuit components that are configured to implement the functions described in connection with the processing circuitry 132. In some embodiments, the processing circuitry 132 may include an Application Specific Integrated Circuit (ASIC), a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132.

With reference now to FIGS. 1B and 1C, alternative configurations of the computational system 100 will be described in accordance with at least some embodiments of the present disclosure. While certain configurations will be discussed in connection with an Ethernet network and IB network, it should be appreciated that the first network type 116 and second network type 120 are not necessarily limited to an Ethernet network and an IB network. Rather the first network type 116 and/or second network type 120 may correspond to any appropriate type of network using any appropriate form of interconnect. Non-limiting examples of network types include Ethernet, InfiniBand, Fibre Channel, Intel Omni-Path, combinations thereof (e.g., Fibre Channel over Ethernet), variants thereof, and the like.

FIG. 1B illustrates a configuration where the first host 108 is connected to an Ethernet network 136 and the second host 112 is connected to an IB network 140. In this particular embodiment, the Ethernet network 136 may utilize protocols defined in accordance with IEEE standard 802.3. To the extent that the Ethernet network 136 utilizes the Ethernet standard, the first host 108 may be configured to also operate in accordance with the Ethernet standard. In some embodiments, the first host 108 may be considered a RoCE host.

The IB network 140 may utilize protocols defined in accordance with the InfiniBand standard. To the extent that the IB network 140 utilizes the InfiniBand standard, the second host 112 may be configured to also operate in accordance with the InfiniBand standard. In some embodiments, the second host 112 may be considered an IB host.

In the illustrative configuration, the first port 124 of the switch device 104 may correspond to an Ethernet port or some variant thereof and the second port 128 may correspond to a Small Form-Factor Pluggable (SFP) network interface or some variant thereof. More specifically, but without limitation, the first port 124 may support 40 GBASE-T 40 Gbps Ethernet, 100 BASE-TX 100 Mbps Ethernet, 1000 BASE-T "gigabit" Ethernet, or the like. Non-limiting examples of the second port 128 include a Quad SFP (QSFP) port, an SFP+ port, a QSFP28 port, a QSFP56 port, an Octal SFP (OSFP) port, or the like.

In the configuration of FIG. 1B, packets originating from the first host 108 may be formatted as RDMA over Ethernet packets. In this configuration, RDMA may correspond to the transport layer (L4) and may use the same headers as in the IB network 140. The packet may further include a User Datagram Protocol (UDP) header, an IP header, and a Media Access Control (MAC) header, where MAC is the Ethernet data-link layer (L2) and IP is the Ethernet network layer (L3). It should be noted that the UDP header may only be used in certain versions of RoCE (e.g., RoCE v2) and may be used as a shim layer in this version of RoCE. The use of a UDP header in RoCE v2 is to make RoCE transparent to firewalls and other network devices by looking like a standard UDP packet. For other versions of RoCE (e.g., RoCE v1.5), the UDP does not need to exist and a Base Transport Header (BTH) may be layered directly on top of the IP header. As will be discussed in further detail herein, the BTH may include an Opcode field that identifies the type of request or response packet, a DestQP field that identifies a destination Queue Pair (QP), and a Packet Sequence Number (PSN) field that permits the recipient to detect missing packets.

Packets originating from the second host 112 may be formatted as RDMA over IB packets. In this configuration, RDMA is the transport layer (L4), which is built on top of a Global Route Header (GRH), which is the IB network layer (L3). The packets may also contain a Local Route Header (LRH), which is the IB data-link layer (L2).

When an RDMA over Ethernet packet (or RoCE packet) is received at the first port 124, the processing circuitry 132 may be configured to strip content from the UDP header (if applicable), the IP header, and the MAC header and convert the stripped content into content for a GRH and LRH header, thereby enabling RDMA connectivity between the Ethernet network 136 and IB network 140. Conversely, when an RDMA over IB packet is received at the second port 128, the processing circuitry 132 may be configured to strip content from a GRH and LRH header and convert the stripped content into content for a MAC header and IP header, and optionally an UDP header, thereby enabling RDMA connectivity between the IB network 140 and Ethernet network 136. In some embodiments, the switch device 104 may support RoCE v1.5 where content from the MAC header and IP header are converted to content for the GRH. For an RoCE v2 example, when an RDMA over IB packet is received, the processing circuitry 132 may be configured to strip the LRH and the GRH and build the new UDP, IP, and MAC headers.

FIG. 1C illustrates another configuration where the first host 108 is connected to the IB network 140 and the second host 112 is connected to the Ethernet network 136. In this configuration, the first host 108 may correspond to an IB host and the second host 112 may correspond to a RoCE host. Capabilities of the processing circuitry 132 in this configuration may be the same or similar as those described in connection with FIGS. 1A and/or 1B. In this configuration, however, the first port 124 facilitates communication and network connectivity with the IB network 140 whereas the second port 128 facilitates communication and network connectivity with the Ethernet network 136.

Figure 2:
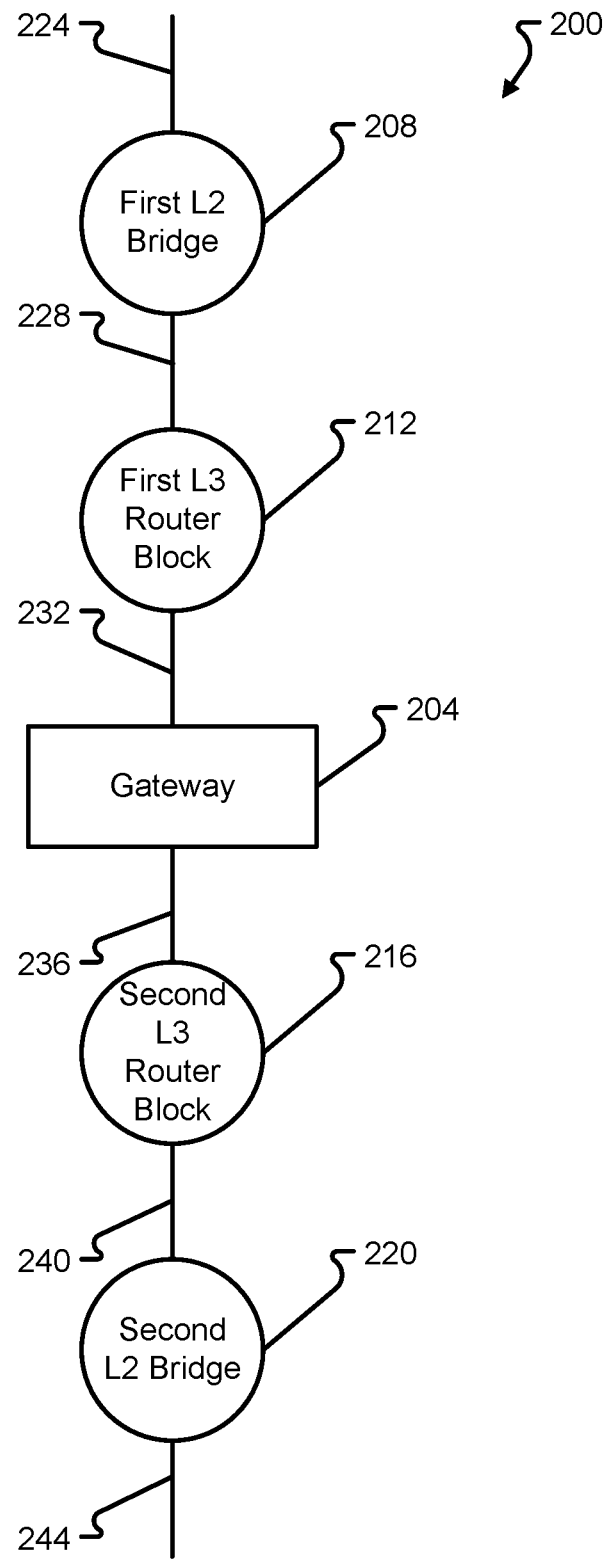
FIG. 2 is a block diagram depicting a logical pipeline that illustrates processing stages that packets traverse in accordance with at least some embodiments of the present disclosure.

Referring now to FIG. 2, additional details of a logical pipeline 200 that may be supported by functionality of the switch device 104 will be described in accordance with at least some embodiments of the present disclosure. FIG. 2 illustrates the pipeline 200 as being bi-directional meaning that packets may flow in either direction of the pipeline. It should be appreciated that the pipeline 200 may be provided within the processing circuitry 132 or some components of the pipeline 200 may be provided within the first port 124 and/or second port 128.

The illustrative pipeline 200 is shown to include a gateway 204 provided between a first L3 router block 212 and a second L3 router block 216. The first L3 router block 212 is provided between the gateway 204 and a first L2 bridge 208. The second L3 router block 216 is provided between the gateway 204 and a second L2 bridge 220. The gateway 204, first L2 bridge 208, first L3 router block 212, second L3 router block 216, and second L2 bridge 220 may all be provided as part of the switch device 104 and, in some embodiments, may be provided as part of the processing circuitry 132.

In some embodiments, the first L2 bridge 208 may correspond to an Ethernet L2 bridge and the first L3 router block 212 may correspond to an IP L3 router block. In some embodiments, the second L2 bridge 220 may correspond to an IB-bridge or IB-bridge block and the second L3 router block 216 may correspond to an IB-router or IB-router block.

In some embodiments, the first L2 bridge 208 may correspond to an IB-bridge and the first L3 router block 212 may correspond to an IB-router. In some embodiments, the second L2 bridge 220 may correspond to an Ethernet L2 bridge and the second L3 router block 216 may correspond to an IP L3 router block.

As can be appreciated, an L3 router block (e.g., first L3 router block 212 or second L3 router block 216) may be configured to process packets at the network layer whereas an L2 bridge (e.g., first L2 bridge 208 or second L2 bridge 220) may be configured to process packets at the data-link layer. Link 224 may be used to receive incoming data packets at the first L2 bridge 208 and provide data packets from the first L2 bridge 208 to an appropriate network connection. Link 228 may be used to carry packets or information between the first L2 bridge 208 and first L3 router block 212. Link 232 may be used to carry packets or information between the first L3 router block 212 and the gateway 204. Link 236 may be used to carry packets or information between the gateway 204 and second L3 router block 216. Link 240 may be used to carry packets or information between the second L3 router block 216 and the second L2 bridge 220. Link 244 may be used to carry data packets or information between the second L2 bridge 220 and the network connected thereto.

Operations of the pipeline 200 will now be described in connection with an example configuration of the components of the pipeline 200. It should be appreciated that the following example is considered to be a non-limiting example of the pipeline 200. In one possible configuration, the first L2 bridge 208 may correspond to an Ethernet L2 bridge, the first L3 router block 212 may correspond to an IP L3 router block, the second L3 router block 216 may correspond to an IB-router, and the second L2 bridge 220 may correspond to an IB L2 bridge. In this illustrative configuration, a packet received at link 224 may be directed to the IP L3 router block using standard forwarding for the Ethernet network 136. In this example, the destination MAC address forwards the packet from the first L2 bridge 208 to the first L3 router block 212 (e.g., the IP L3 router block). In the IP L3 router block, standard IP routing forwarding is performed such that the destination IP address is looked up in a Forwarding Information Base (FIB). It may be assumed here that a management plane assigns an IP address to the second host 112 in the IB network 140 (e.g., where the first host 108 is attempting to perform RDMA with the second host 112 and the first host 108 is a RoCE host whereas the second host 112 is an IB host).

The IP address assigned by the management plane will send the received packet to a new block inside the gateway 204 that translates the IP address to a Global Identifier (GID) address. This translation from IP address to GID address may be performed in a number of ways. In one example, the translation from IP address to GID address may be performed by using a translation table in the gateway 204 or in an appropriate block (e.g., the first L3 router block 212) of the data pipeline 200. Another possible translation method may include an algorithmic translation where the GID address is determined as a function of the IP address.

When the GID is retrieved, the packet may be sent to the IB-router, which is configured to perform standard GRH routing flow. Thereafter, the IB-router may provide the packet to the IB-bridge, which forwards the packet to the second host 112 connected to the IB network 140. Thus, the pipeline 200 and the components thereof may be configured to modify/translate packets received at link 224 originating from the Ethernet network 136 for transmission over the IB network 140 on link 244.

It should be appreciated that the modification/translation process is substantially symmetric, which means that the pipeline 200 may be configured to perform the above-described operation, but in reverse, when processing a packet received from the IB network 140 (e.g., on link 244) for transmission over the Ethernet network 136 (e.g., on link 224).

In some embodiments, the pipeline 200 described herein may be configured to allow wire-speed operations for connecting a first network type 116 to a second network type 120. Specifically, but without limitation, the pipeline 200 may be configured to enable wire-speed operations for connecting a RoCE network and an IB network 140 and to facilitate RDMA between hosts connected to the different network types. The one-path implementation depicted and described herein does not sacrifice any appropriate loopback ports and, thus, supports full bandwidth gateway functionality.

Figure 3:
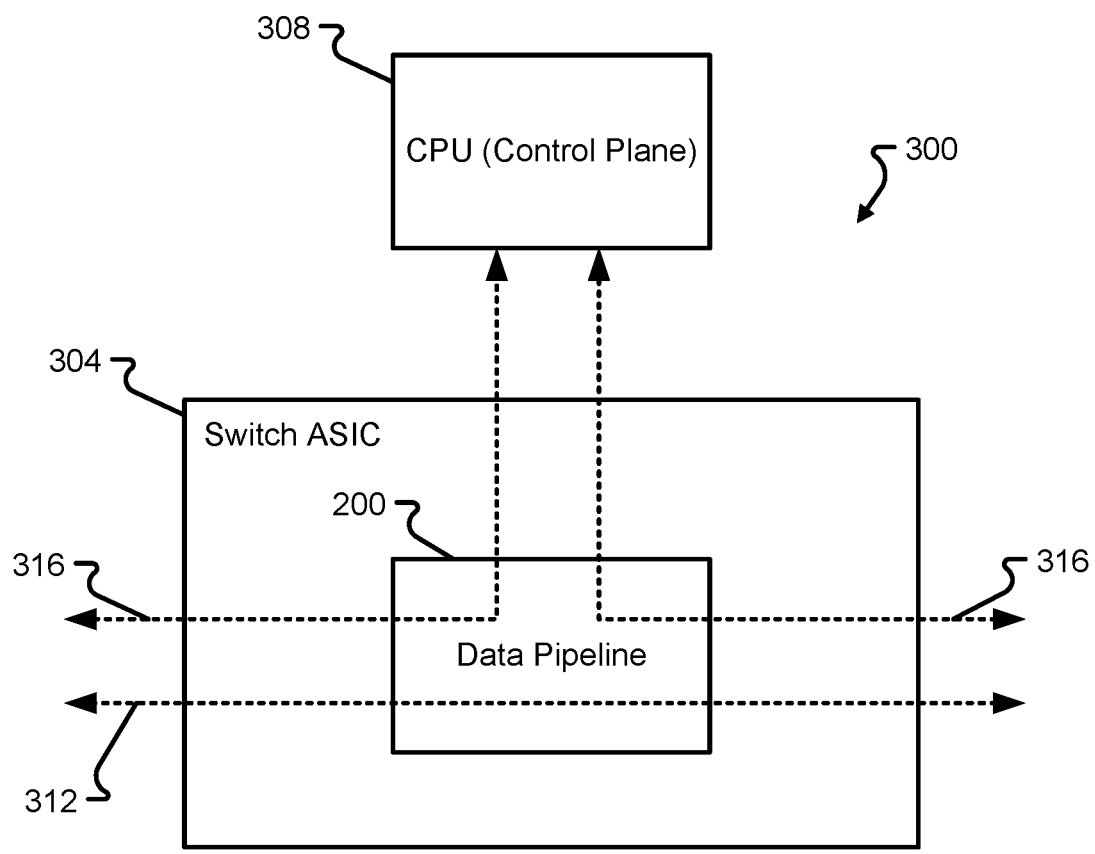
FIG. 3 is a block diagram depicting details of a switch device in accordance with at least some embodiments of the present disclosure.

Referring now to FIG. 3, additional details of a switch device 104 and the utilization of a control plane 308 therein will be described in accordance with at least some embodiments of the present disclosure. FIG. 3 illustrates a switch ASIC 304 that includes the data pipeline 200 described in connection with FIG. 2. It should be appreciated that the system 300 components may be entirely integrated into a switch device 104 and, more specifically, the processing circuitry 132 of a switch device 104. Said another way, the processing circuitry 132 may be configured to include the switch ASIC 304 as well as a CPU that manages the control plane 308.

Opening a connection between two hosts in an IB network 140 sometimes requires special messaging over QP1, which is documented in the IB standards. Part of the information that is exchanged to open this connection relates to the addressing scheme in the IB network (e.g., the GID addresses of the hosts). A similar process occurs in the Ethernet network 136 (and specifically a RoCE network), but the information exchanged to open the connection relates to IP addresses and not GID addresses. The use of different addressing to open a connection in the Ethernet network 136 versus the IB network 140 poses an additional technical problem for the switch device 104. Specifically, the switch device 104 may be configured to accommodate the different addressing schemes.

In accordance with at least some embodiments, the switch device 104 may be configured to include the switch ASIC 304 and the CPU for managing the control plane 308. In a first stage each IB host may be given an alias name in the Ethernet network 136 (e.g., RoCE network) and each RoCE host may be given an alias name in the IB network 140. The switch 104 and the data pipeline 200 provided therein may be configured to trap appropriate QP connection establishment messages received on a fast data path 312 and provide the intercepted QP connection establishment messages to the CPU that manages the control plane 308 via a slow path 316. The slow path 316 may carry intercepted messages that are processed out of band by the CPU that manages the control plane 308, while still allowing data packets to pass through the fast data path 312, which bypasses the CPU that manages the control plane 308.

The CPU that manages the control plane 308 may be configured to translate the QP connection establishment message intercepted from the fast data path 312. Specifically, the CPU that manages the control plane 308 may have information regarding the alias of hosts in the other network and the CPU that manages the control plane 308 may be configured to use the alias information to translate the QP connection establishment message to an address for a connect message to be used in the other network type. Translations may be performed in either direction (e.g., from IB network 140 to Ethernet network 140 and vice versa).

In some embodiments, after the procedure of translating the QP connection establishment message(s), the CPU that manages the control plane 308 may configure the ASIC 304 to establish the fast data path 312. Specifically, the CPU that manages the control plane 308 may configure the fast data path 312 to translate the GID address to IP address in one direction and translate the IP address to GID address in the other direction. Once the ASIC 304 has been configured by the CPU that manages the control plane 308, then traffic can flow through the fast data path 312 using hardware translation for the majority of packets.

With reference now to FIGS. 4-9, various operations and capabilities of the systems and components described herein will be described in accordance with at least some embodiments of the present disclosure. It should be appreciated that any appropriate combination of the methods depicted and described herein may be combined with any other appropriate method. It should also be appreciated that the method steps may be performed in any appropriate order without departing from the scope of the present disclosure. Further still, while certain method steps may be described as being performed by a particular component, embodiments of the present disclosure are not so limited and any of the appropriate components depicted and described herein may be configured to perform some or all of the method steps described herein.

Figure 4:
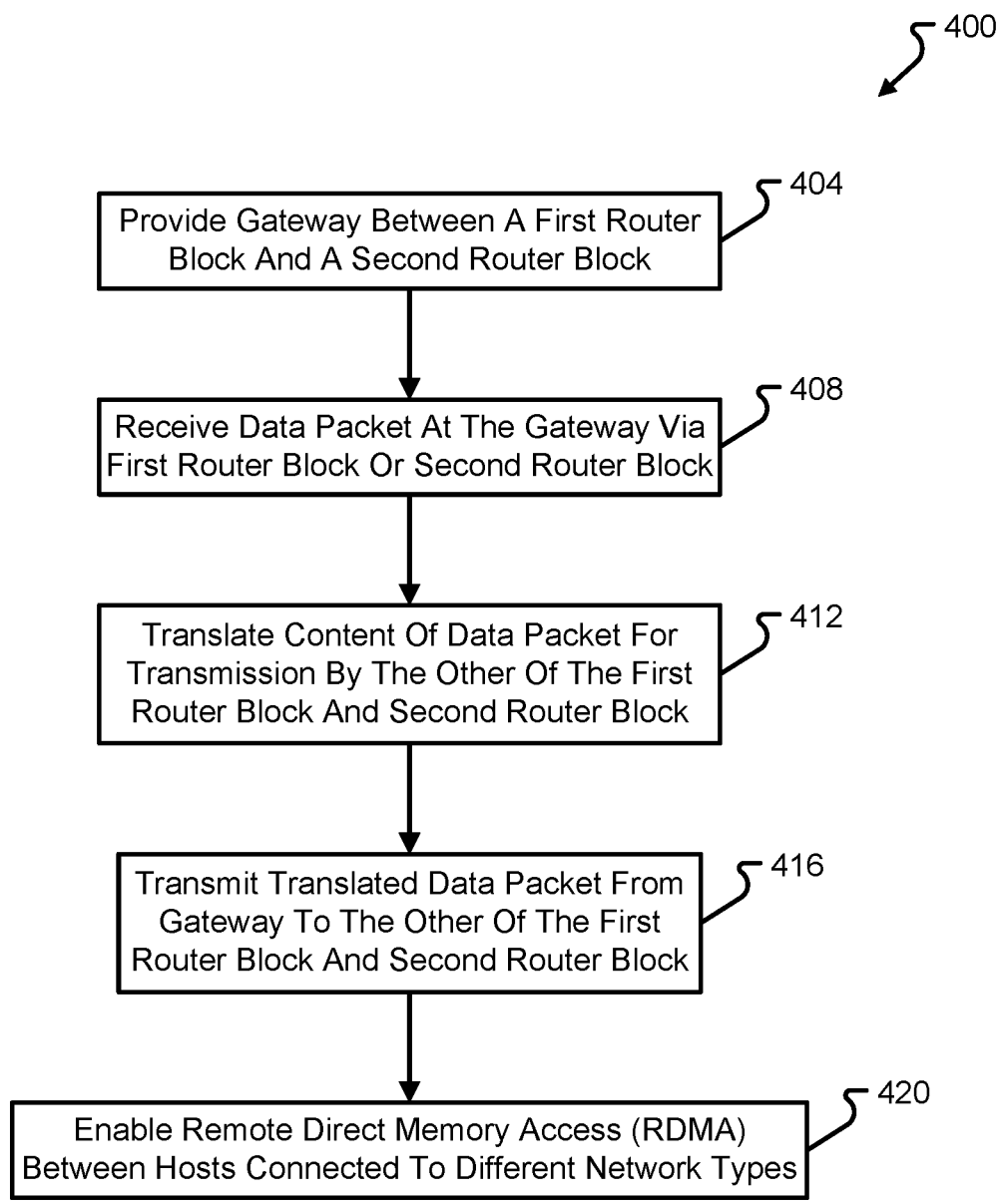
FIG. 4 is a flow diagram depicting a first RDMA method in accordance with at least some embodiments of the present disclosure.

Referring initially to FIG. 4, a first RDMA method 400 will be described in accordance with at least some embodiments of the present disclosure. The method 400 begins by providing a gateway 204 between a first router block 212 and a second router block 216 (step 404). In some embodiments, the gateway 204 may be provided between a first L3 router block 212 and a second L3 router block 216. As a non-limiting example, the first L3 router block 212 may correspond to an IP L3 router block and the second L3 router block 216 may correspond to an IB-router that is configured to perform GRH routing flows. As another non-limiting example, the first L3 router block 212 may correspond to an IB-router and the second L3 router block 216 may correspond to an IP L3 router block.

The method 400 continues when an RDMA packet is received at the gateway 204 via the first router block or second router block (step 408). The gateway 204 may then translate the content of the RDMA packet received in step 408 for transmission by the other of the first router block and the second router block (step 412). In this step, if the RMDA packet is received at the first router block, then the gateway 204 may translate content of the RDMA packet for transmission by the second router block. Conversely, if the RDMA packet is received at the second router block, then the gateway 204 may translate content of the RDMA packet for transmission by the first router block. Such translations may include address translation as well as other translations that are useful to enable certain functions within a particular network type in accordance with the protocols defined for that network type (e.g., congestion handling, Quality of Service (QoS) handling, control plane management, etc.).

Once the translation has been performed by the gateway 204, the method 400 continues with the gateway 204 transmitting the translated RDMA packet to the other of the first router block 212 and second router block 216 (step 416). Thus, if the RDMA packet is received from the first router block 212, then the translated RDMA packet is transmitted to the second router block 216. Instead, if the RDMA packet is received from the second router block 216, then the translated RDMA packet is transmitted to the first router block 212.

The translation performed at the gateway 204 may enable RDMA between a first host 108 connected to a first network type 116 and a second host 112 connected to a second network type 120 (step 420). In some embodiments and as discussed hereinabove, the first network type 116 may be different from the second network type 120, but the translation capabilities of the gateway 204 (and pipeline 200 that includes the gateway 204) may facilitate RDMA between different types of hosts (e.g., between a RoCE host and IB host).

Figure 5:
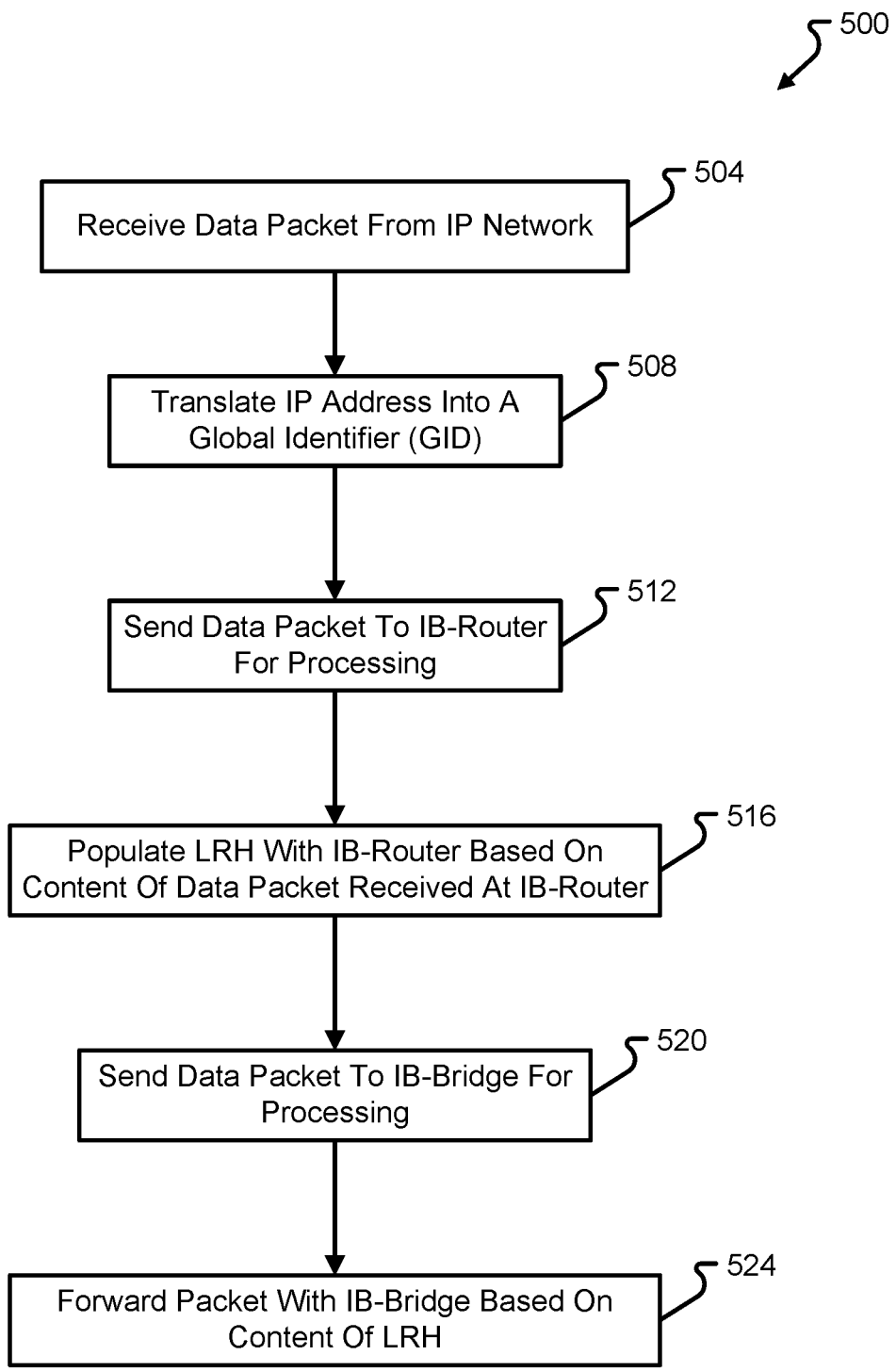
FIG. 5 is a flow diagram depicting a second RDMA method in accordance with at least some embodiments of the present disclosure.

Referring now to FIG. 5, details of a second RDMA method 500 will be described in accordance with at least some embodiments of the present disclosure. The method 500 begins when an RDMA packet is received from an IP network (e.g., an Ethernet network 136 and/or RoCE network) (step 504). The RDMA packet may be received at the switch device 104 and may be processed by the pipeline 200 of the switch device 204.

The method 500 continues by translating an IP address contained in the RDMA packet into a GID address (step 508). The translation from an IP address may occur within the gateway 204 or some other component of the pipeline 200. As discussed above, the translation may be performed with the assistance of a translation table or the GID address may be determined as a function of the IP address.

The RDMA packet with the GID address (e.g., post translation from IP address to GID address), may then be sent to an IB-router for further processing (step 512). In some embodiments, the IB-router may correspond to one of the first L3 router block 212 and second L3 router block 216.

The IB-router may populate the LRH based on content of the RDMA packet (step 516). Specifically, the GRH may be populated based on content of an IP header and/or MAC header contained in the RDMA packet that was originally received from the Ethernet network 136 or RoCE network.

The method 500 may continue by sending the RDMA packet (now with a properly populated LRH) to an IB-bridge for additional processing (step 520). The IB-bridge may be configured to use content of the LRH to determine which egress port to send the data packet to (step 524). Specifically, the IB-bridge may be configured to perform traditional routing flows using L2 information.

Figure 6:
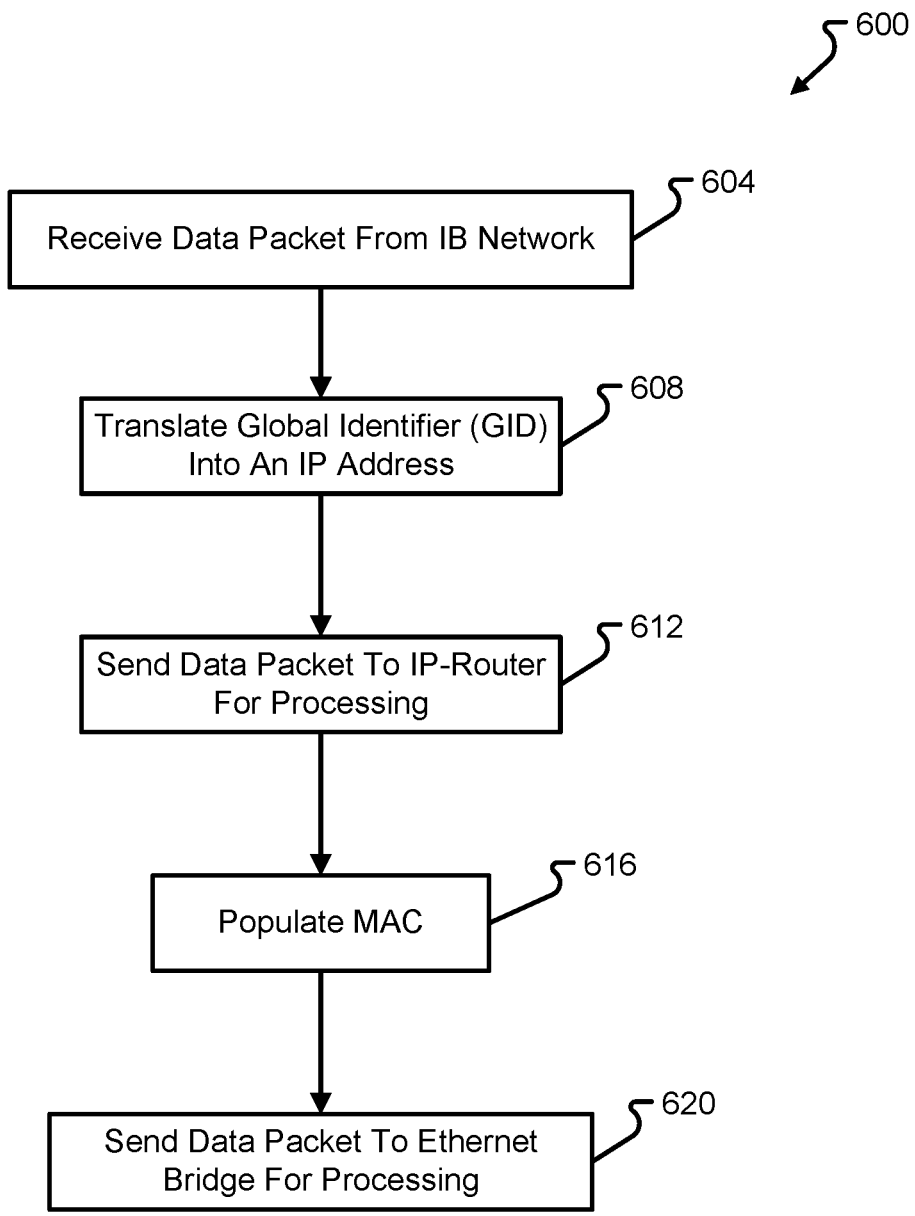
FIG. 6 is a flow diagram depicting a third RDMA method in accordance with at least some embodiments of the present disclosure.

Referring now to FIG. 6, details of a third RDMA method 600 will be described in accordance with at least some embodiments of the present disclosure. The method 600 begins when an RDMA packet is received from an IB network 140 (step 604). The RDMA packet may include a GRH and LRH and may have been initiated by an IB host.

The method 600 continues with a gateway 204 translating a GID address contained in the RDMA packet into an IP address (step 608). Again the translation between GID address and IP address may be performed with the assistance of a translation table and/or may be performed algorithmically by determining the IP address as a function of the GID address. The gateway 204 may also be configured to populate the UDP header and/or IP header for the RDMA packet to be transmitted over the Ethernet network 136 or RoCE network.

The method 600 continues by sending the RDMA packet with an IP address to an IP L3 router block for processing (step 612). At the IP L3 router block, the MAC address may be populated (step 616). In some embodiments, the MAC header may be populated based on information contained in the GRH of the RDMA packet received at step 604.

The RDMA packet may then be provided to the Ethernet bridge for additional processing in accordance with the Ethernet Bridging standards (step 620). The RDMA packet may then be ready for transmission over the Ethernet network 136 or RoCE network.

Figure 7:
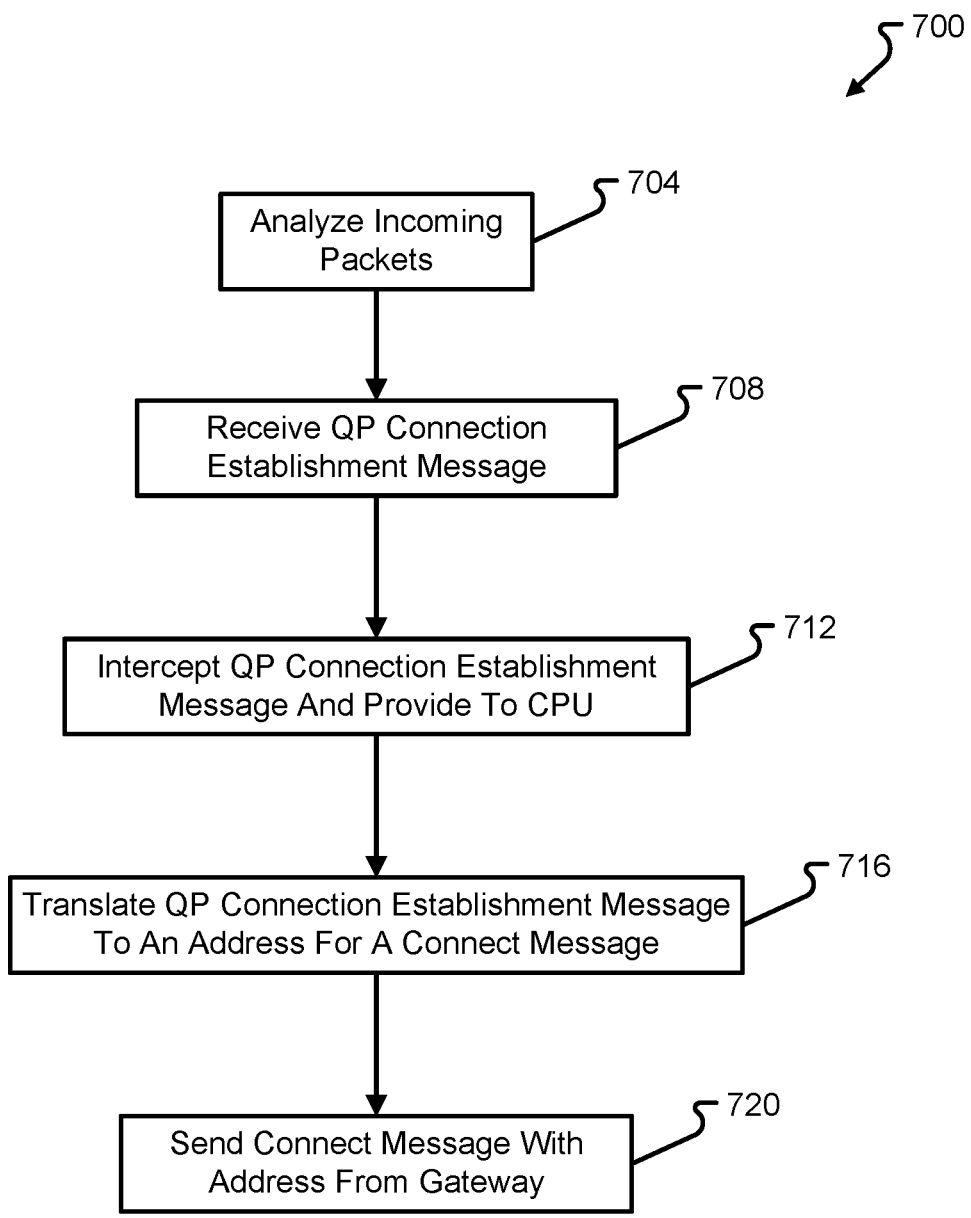
FIG. 7 is a flow diagram depicting a fourth RDMA method in accordance with at least some embodiments of the present disclosure.

Referring now to FIG. 7, additional details of a fourth RDMA method 700 will be described in accordance with at least some embodiments of the present disclosure. The method 700 may correspond to a process for opening a connection between two hosts, where one host is connected to a first network type 116 and another host is connected to a second network 120 type that is different from the first network type 116.

The method 700 may begin with a switch ASIC 304 analyzing incoming packets received at either the first port 124 of the switch device 104 or the second port 128 of the switch device 104 (step 704). While analyzing the incoming packets, the switch ASIC 304 may recognize one of the incoming packets as belonging to or being a part of a QP connection establishment message (step 708).

Upon receiving the QP connection establishment message, the switch ASIC 304 may intercept the QP connection establishment message and provide the QP connection establishment message to the CPU that manages the control plane 308 (step 712). The CPU that manages the control plane 308 may be configured to translate the QP connection establishment message to an address for a connect message to be transmitted in the other network type (step 716).

The translated QP connection establishment message may be provided back to the switch ASIC 304, which sending the connection message with the new address from the gateway 204 to the destination host in the different network type (step 720). The translated QP connection establishment message may or may not necessarily flow through the appropriate L3 router block and L2 bridge.

Figure 8:
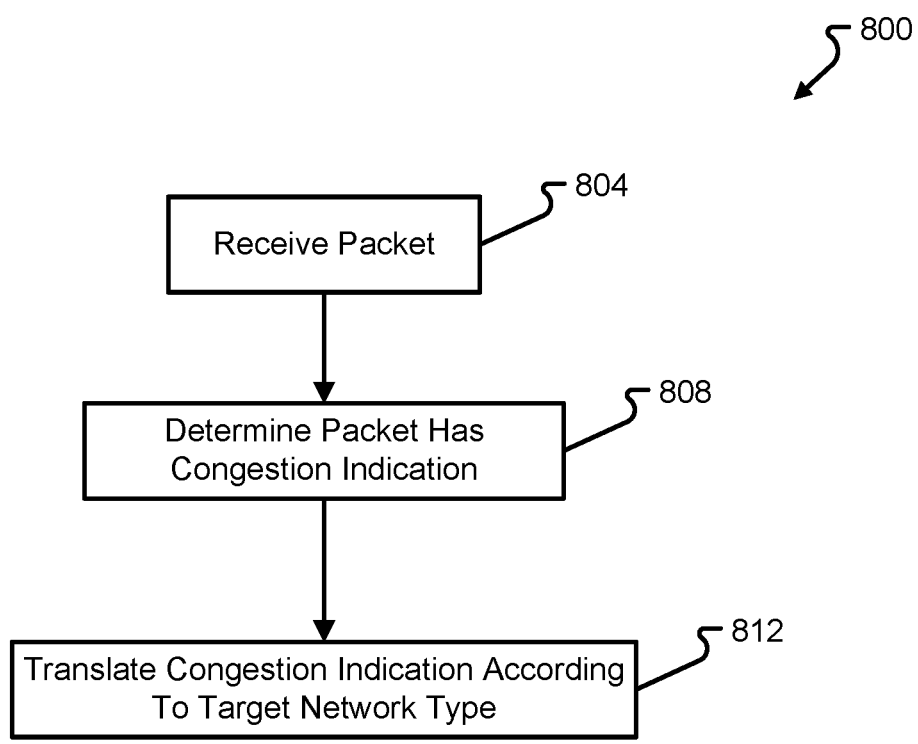
FIG. 8 is a flow diagram depicting a fifth RDMA method in accordance with at least some embodiments of the present disclosure.

With reference now to FIG. 8, details of a fifth RDMA method 800 will be described in accordance with at least some embodiments of the present disclosure. The method 800 may correspond to a congestion handling method that manages congestion between the different network types even though each network type uses a different header and/or field value to manage congestion handling.

The method 800 begins when an RDMA packet is received at the gateway 204 (step 804). The method 800 may continue when the gateway 204 determines that the RDMA packet has a congestion indication contained therein (step 808). In an Ethernet network 136 or RoCE network, congestion is marked in the IP (L3) header in the ECN field. In the IB network 140, congestion is marked in the FECN field in the BTH (L4) header. The pipeline 200 and gateway 204 contained therein may be configured to support the translation of FECN to ECN and vice versa (step 812).

In addition, Congestion Notification Messages (CNP), which are sent from the end-nodes (as a response to ECN/FECN notification) must be translated as well to have a fully functional congestion control loop. The pipeline 200 and gateway 204 contained therein may be configured to support this translation, which also includes some modifications to the opcode field in the BTH header.

Figure 9:
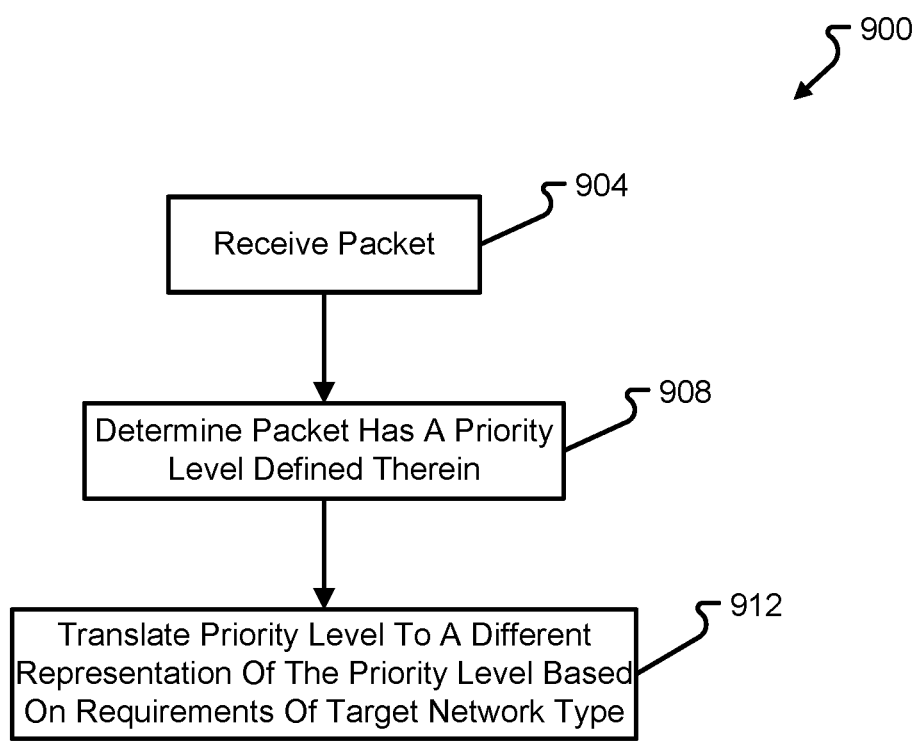
FIG. 9 is a flow diagram depicting a sixth RDMA method in accordance with at least some embodiments of the present disclosure.

With reference now to FIG. 9, details of a sixth method 900 will be described in accordance with at least some embodiments of the present disclosure. The method 900 may correspond to a QoS management method 900 performed by the switch device 104 connected between different network types. The method 900 begins when an RDMA packet is received at the gateway 204 (step 904). The method 900 may continue by determining that the RDMA packet has a priority level defined therein (step 908). The priority level defined within the RDMA packet may indicate a routing priority, a processing priority, or some other indication for network components to understand that the RDMA packet is to be processed outside of the normal processing routine.

QoS is a way to assign different priorities to different packets when the packets traverse a network. QoS is derived by a field in the packet that is mapped to the required priority. For an Ethernet network 136 or RoCE network, priority may be represented in either the DSCP field in the IP header or in a PCP field in the MAC/VLAN header. In an IB network 140, an RDMA packet may provide a representation of priority in a different way. Specifically, QoS may derived from the SL field in the LRH header. The gateway 204 may be configured to support translating the appropriate fields in the headers to maintain the packet priority when traversing between one network type and another network type (e.g., between an Ethernet network 136 or RoCE network and an IB network 140) (step 912).

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A system, comprising:
   one or more processing circuits positioned between a first port and a second port of a switch device, the one or more processing circuits comprising:
   a first router block configured to receive a first type of Remote Direct Memory Access (RDMA) packet;
   a second router block configured to receive a second type of RDMA packet; and
   a gateway positioned between the first router block and the second router block, wherein the gateway is configured to receive an output of the first router block, process the output of the first router block by translating the first type of RDMA packet received from the first router block for transmission as the second type of RDMA packet by the second router block, and then provide an output to the second router block that contains the second type of RDMA packet.

2. The system of claim 1, wherein the gateway is further configured to translate the second type of RDMA packet received from the second router block for transmission as the first type of RDMA packet by the first router block.

3. The system of claim 1, wherein the first router block comprises an InfiniBand (IB) router block and wherein the second router block comprises an Internet Protocol (IP) router block.

4. The system of claim 3, wherein the first type of RDMA packet comprises an RDMA over IB packet and wherein the second type of RDMA packet comprises an RDMA over Ethernet packet.

5. The system of claim 1, wherein the first router block comprises an Internet Protocol (IP) router block and wherein the second router block comprises an InfiniBand (IB) router block.

6. The system of claim 5, wherein the first type of RDMA packet comprises an RDMA over Ethernet packet and wherein the second type of RDMA packet comprises an RDMA packet.

7. The system of claim 1, further comprising:
   an Application Specific Integrated Circuit (ASIC), wherein the gateway is provided in the ASIC, and wherein the first router block comprises an IB-router; and
   an IB-bridge connected to the IB-router, wherein the second router block is configured to use IP addressing, and wherein the IB-bridge and IB-router do not use IP addressing.

8. The system of claim 7, wherein the gateway is further configured to populate a User Datagram Protocol (UDP) header and an IP header with content obtained from the IB-router.

9. The system of claim 1, wherein the gateway is further configured to translate content from an Explicit Congestion Notification (ECN) field to content for a Forward Explicit Congestion Notification (FECN) field.

10. The system of claim 9, wherein the gateway is further configured to translate content from a Congestion Notification Message (CNP) by modifying an opcode field.

11. The system of claim 1, further comprising:
    a Central Processing Unit (CPU) configured to intercept a Queue Pair (QP) connection establishment message and translate the QP connection establishment message to an address for a connect message.

12. The system of claim 11, wherein data packets bypass the CPU.

13. The system of claim 1, wherein the gateway is further configured to translate a priority level defined in the first type of RDMA packet to a different representation of the priority level in the second type of RDMA packet.

14. The system of claim 1, wherein the gateway is further configured to translate between an Internet Protocol (IP) address and a Global Identifier (GID) address.

15. A switch device configured to facilitate Remote Direct Memory Access (RDMA) between a first host connected to a first network type and a second host connected to a second network type, the switch device comprising:
    a first port connectable to and configured to operate with the first network type, wherein the first port is further configured to receive packets formatted as a first type of RDMA packet;
    a second port connectable to and configured to operate with the second network type, wherein the second port is further configured to receive packets formatted as a second type of RDMA packet; and
    one or more processing circuits positioned between the first port and the second port, wherein the one or more processing circuits comprise a first router block, a second router block, and a gateway, wherein the first router block receives the first type of RDMA packet from the first port, wherein the gateway is positioned between the first router block and the second router block and is configured to translate the first type of RDMA packet received from the first router block for transmission as the second type of RDMA packet by the second router block, and wherein the second router block is configured to transmit the second type of RDMA packet via the second port thereby enabling RDMA between the first host and the second host.

16. The switch device of claim 15, wherein the packets received from the first port comprise a Global Route Header (GRH) and a Local Route Header (LRH), wherein the packets received from the second port comprise a Media Access Control (MAC) header and an Internet Protocol (IP) header, and wherein content from the GRH is used to populate the MAC header and the IP header when translating packets received from the first port for transmission via the second port.

17. The switch device of claim 15, wherein the packets received from the second port comprise a Global Route Header (GRH) and a Local Route Header (LRH), wherein the packets received from the first port comprise a Media Access Control (MAC) header and an Internet Protocol (IP) header, and wherein content from the MAC header and IP header is used to populate the GRH when translating packets received from the first port for transmission via the second port.

18. A method of operating a switch device, comprising:
providing a gateway between a first router block of the switch device and a second router block of the switch device, wherein the first router block is configured to receive a first type of Remote Direct Memory Access (RDMA) packet, and wherein the second router block is configured to receive a second type of RDMA packet;
receiving a data packet at the gateway via one of the first router block and second router block;
translating content of the data packet for transmission by the other of the first router block and second router block; and
transmitting the data packet with the translated content from the gateway to the other of the first router block and second router block thereby enabling RDMA between a first host connected to a first network and a second host connected to a second network that is of a different type than the first network.

19. The method of claim 18, wherein the data packet is received via the first router block and transmitted to the second router block, wherein the first router block comprises an InfiniBand (IB) router block, and wherein the second router block comprises an Internet Protocol (IP) router block, the method further comprising:
converting content from a Global Route Header (GRH) into content for an Internet Protocol (IP) header and a Media Access Control (MAC) header.

20. The method of claim 18, wherein the data packet is received via the second router block and transmitted to the first router block, wherein the first router block comprises an InfiniBand (IB) router block, and wherein the second router block comprises an Internet Protocol (IP) router block, the method further comprising:
converting content from an Internet Protocol (IP) header and a Media Access Control (MAC) header to content for a Global Route Header (GRH).

21. A method, comprising:
receiving, at a first router block from a first host connected to a first network type, a first type of Remote Direct Memory Access (RDMA) packet;
providing, from the first router block to a gateway, the first type of RDMA packet;
translating, with the gateway, content from the first type of RDMA packet into a second type of RDMA packet for transmission across a second network type;
providing, from the gateway to a second router block, the second type of RDMA packet; and
transmitting the second type of RDMA packet from the second router block to a second host connected to the second network type.

22. The method of claim 21, wherein the first type of RDMA packet comprises an RDMA over InfiniBand (IB) packet and wherein the second type of RDMA packet comprises an RDMA over Ethernet packet, wherein the first network type comprises an IB network, wherein the second network type comprises an Ethernet network, and wherein the gateway translates a Global Identifier (GID) address to an Internet Protocol (IP) address.

23. The method of claim 21, wherein the first type of RDMA packet comprises an RDMA over Ethernet packet and wherein the second type of RDMA packet comprises an RDMA over InfiniBand (IB) packet, wherein the first network type comprises an Ethernet network, wherein the second network type comprises an IB network, and wherein the gateway translates an Internet Protocol (IP) address to a Global Identifier (GID) address.

24. A system, comprising:
one or more processing circuits positioned between a first port and a second port of a switch device, the one or more processing circuits comprising:
a first router block configured to receive a first type of Remote Direct Memory Access (RDMA) packet;
a second router block configured to receive a second type of RDMA packet; and
a gateway positioned between the first router block and the second router block, wherein the gateway is configured to translate the first type of RDMA packet received from the first router block for transmission as the second type of RDMA packet by the second router block.

25. The system of claim 24, wherein the one or more processing circuits comprise a data pipeline.

* * * * *